(12) United States Patent
Gupta et al.

(10) Patent No.: US 10,425,342 B2
(45) Date of Patent: Sep. 24, 2019

(54) METHODS, SYSTEMS, AND COMPUTER READABLE MEDIA FOR PRIORITY ROUTING OF DIAMETER MESSAGES

(71) Applicant: Oracle International Corporation, Redwood Shores, CA (US)

(72) Inventors: Nitin Gupta, Bangalore (IN); Shashikiran Bhalachandra Mahalank, Bangalore (IN); Venkatesh Aravamudhan, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 15 days.

(21) Appl. No.: 15/382,057

(22) Filed: Dec. 16, 2016

(65) Prior Publication Data

US 2018/0176141 A1 Jun. 21, 2018

(51) Int. Cl.
| | |
|---|---|
| *H04L 12/851* | (2013.01) |
| *H04L 12/741* | (2013.01) |
| *H04L 29/12* | (2006.01) |
| *H04L 12/24* | (2006.01) |
| *H04L 29/06* | (2006.01) |

(52) U.S. Cl.
CPC .......... *H04L 47/24* (2013.01); *H04L 41/5003* (2013.01); *H04L 45/74* (2013.01); *H04L 47/2433* (2013.01); *H04L 61/203* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 6,819,652 B1 | 11/2004 | Akhtar et al. | |
| 6,865,153 B1 * | 3/2005 | Hill | H04L 47/10 370/230.1 |

(Continued)

FOREIGN PATENT DOCUMENTS

| | | |
|---|---|---|
| CN | 101494608 A | 7/2009 |
| CN | 201180018952 | 5/2016 |

(Continued)

OTHER PUBLICATIONS

Donovan, S., "Diameter Routing Message Priority," IETF RFC 7944, Oracle, pp. 1-18 (Aug. 2016).

(Continued)

*Primary Examiner* — Shukri Taha
(74) *Attorney, Agent, or Firm* — Jenkins, Wilson, Taylor & Hunt, P.A.

(57) ABSTRACT

Methods, systems, and computer readable media for priority routing of Diameter messages are disclosed. In some examples, a method includes determining a Diameter Routing Message Priority (DRMP) priority value for a Diameter message. The method includes marking each of one or more Internet protocol (IP) packets carrying the Diameter message with an IP quality of service (QoS) value for the Diameter message based on the DRMP priority value. The method includes sending the one or more IP packets carrying the Diameter message to a destination Diameter node by way of an IP router on a data communications network providing quality of service using IP QoS values.

14 Claims, 5 Drawing Sheets

(56) References Cited

U.S. PATENT DOCUMENTS

| | | | |
|---|---|---|---|
| 7,333,438 | B1 | 2/2008 | Rabie et al. |
| 7,532,647 | B2 | 5/2009 | Eichler et al. |
| 7,636,362 | B2 | 12/2009 | Singh et al. |
| 7,822,023 | B2 | 10/2010 | Lahetkangas et al. |
| 7,827,256 | B2 | 11/2010 | Phillips et al. |
| 8,644,324 | B2 | 2/2014 | Kanode et al. |
| 10,321,300 | B2 | 6/2019 | Juneja |
| 2002/0087723 | A1 | 7/2002 | Williams et al. |
| 2003/0095536 | A1 | 5/2003 | Hu et al. |
| 2004/0098612 | A1 | 5/2004 | Lee et al. |
| 2007/0076600 | A1 | 4/2007 | Ekl et al. |
| 2008/0186852 | A1 | 8/2008 | Sami et al. |
| 2008/0212576 | A1 | 9/2008 | O'Neill |
| 2009/0034428 | A1* | 2/2009 | Jeong ............ H04L 47/10 370/252 |
| 2009/0080440 | A1 | 3/2009 | Balyan et al. |
| 2009/0232011 | A1 | 9/2009 | Li et al. |
| 2009/0296688 | A1 | 12/2009 | Bakker et al. |
| 2009/0319686 | A1 | 12/2009 | Watanabe |
| 2010/0017846 | A1 | 1/2010 | Huang et al. |
| 2010/0135287 | A1 | 6/2010 | Hosain et al. |
| 2010/0255826 | A1 | 10/2010 | Brewer et al. |
| 2011/0090902 | A1* | 4/2011 | Jung ............... H04L 65/1016 370/352 |
| 2011/0116382 | A1 | 5/2011 | McCann et al. |
| 2011/0195710 | A1 | 8/2011 | Nas et al. |
| 2011/0200053 | A1 | 8/2011 | Kanode et al. |
| 2012/0224677 | A1 | 9/2012 | Riley et al. |
| 2013/0223222 | A1 | 8/2013 | Kotecha et al. |
| 2014/0365684 | A1* | 12/2014 | Mann .............. G06F 11/00 709/242 |
| 2015/0085664 | A1* | 3/2015 | Sachdev .......... H04L 41/5019 370/236 |
| 2015/0127759 | A1 | 5/2015 | Siegel et al. |
| 2015/0222489 | A1* | 8/2015 | Perez Martinez ... H04W 24/02 370/328 |
| 2016/0156748 | A1 | 6/2016 | Yang et al. |
| 2016/0227457 | A1 | 8/2016 | Tanaka et al. |
| 2017/0347368 | A1 | 11/2017 | Juneja |
| 2018/0123950 | A1* | 5/2018 | Garg ............... H04L 45/38 |
| 2018/0146503 | A1 | 5/2018 | Castro Castro et al. |
| 2018/0159766 | A1* | 6/2018 | Cui ................ H04L 45/302 |

FOREIGN PATENT DOCUMENTS

| | | |
|---|---|---|
| EP | 2 534 793 | 1/2018 |
| WO | WO 2009/070179 A1 | 6/2009 |
| WO | WO 2011/100600 A2 | 8/2011 |
| WO | WO 2017/205116 A1 | 11/2017 |
| WO | WO 2018/112158 | 6/2018 |

OTHER PUBLICATIONS

Letter Regarding Notification of Grant for Chinese Patent Application No. 201180018952.0 (dated Mar. 1, 2016).

Notification of the Third Office Action for Chinese Application No. 201180018952.0 (dated Sep. 15, 2015).

Second Office Action for Chinese Patent Application No. 201180018952.0 (dated Feb. 16, 2015).

First Office Action for Chinese Patent Application No. 201180018952.0 (dated Jun. 26, 2014).

Extended European Search Report for European Application No. 11742905.0 (dated Dec. 11, 2013).

Notice of Allowance and Fee(s) Due for U.S. Appl. No. 13/026,060 (dated Sep. 25, 2013).

Final Office Action for U.S. Appl. No. 13/026,060 (dated May 10, 2013).

Communication of European Publication No. and Information on the Application of Article 67(3) EPC for European Patent Application No. 11742905.0 (dated Nov. 21, 2012).

Non-Final Official Action for U.S. Appl. No. 13/026,060 (dated Sep. 19, 2012).

Notification of Transmittal of the International Search Report and the Written Opinion of the International Searching Authority, or the Declaration for International Application No. PCT/US2011/024611 (dated Oct. 20, 2011).

3GPP, "3rd Generation Partnership Project; Technical Specification Group Core Network and Terminals; Diameter-based Protocols Usage and Recommendations in 3GPP (Release 9)," 3GPP TR 29.909 V9.0.0 (Dec. 2009).

Tsou et al., "Realm-Based Redirection in Diameter," Internet Engineering Task Force, draft-ietf-dime-realm-based-redirect-02, pp. 1-7 (Oct. 27, 2009).

3GPP, "3rd Generation Partnership Project; Technical Specification Group core Network and Terminals; Generic Authentication Architecture (GAA); Zh and Zn Interfaces Based on the Diameter Protocol; Stage 3 (Release 8)," 3GPP TS 29.109 V8.3.0 (Sep. 2009).

3GPP, "3rd Generation Partnership Project; Technical Specification Group Core Network and Terminals; Numbering, Addressing and Identification (Release 8)," 3GPP TS 23.003 V8.6.0 (Sep. 2009).

Jones et al., "Diameter Extended NAPTR," Internet-Draft, draft-jones-dime-extended-naptr-00, pp. 1-8 (Aug. 23, 2009).

Korhonen et al., "Diameter User-Name and Realm Based Request Routing Clarifications," Internet-Draft, draft-ietf-dime-nai-routing-03.txt, pp. 1-11 (Aug. 19, 2009).

3GPP, "3rd Generation Partnership Project; Technical Specification Group Core Network and Terminals; Evolved Packet System (EPS); Mobility Management Entity (MME) and Serving GPRS Support Node (SGSN) Related Interfaces Based on Diameter Protocol (Release 8)," ETSI TS 129.272 V8.3.0 (Jun. 2009).

3GPP, "3rd Generation Partnership Project; Technical Specification Group Core Network and Terminals; Diameter-based Protocols Usage and Recommendations in 3GPP (Release 8)," 3GPP TR 29.909 V8.1.2 (Jan. 2009).

Aboba et al., "The Network Access Identifier," Network Working Group, RFC 4282, pp. 1-17 (Dec. 2005).

Calhoun et al., "Diameter Mobile IPv4 Application," Network Working Group, RFC 4004, pp. 1-50 (Aug. 2005).

Aboba et al., "Authentication, Authorization and Accounting (AAA) Transport Profile," Network Working Group, RFC 3539, pp. 1-39 (Jun. 2003).

Black et al., "Per Hop Behavior Identification Codes," Network Working Group, RFC 3140, pp. 1-8 (Jun. 2001).

Heinanen et al., "Assured Forwarding PHB Group," Network Working Group, RFC 2597, pp. 1-12 (Jun. 1999).

Jacobson et al., "An Expedited Forwarding PHB," Network Working Group, RFC 2598, pp. 1-12 (Jun. 1999).

Blake et al., "An architecture for Differentiated Services," Network Working Group, RFC 2475, pp. 1-37 (Dec. 1998).

Nichols et al., "Definition of the Differentiated Services Field (DS Field) in the IPv4 and IPv6 Headers," Network Working Group, RFC 2474, pp. 1-21 (Dec. 1998).

Deering et al., "Internet Protocol, Version 6 (IPv6) Specification," Networking Working Group, RFC 2460, pp. 1-40 (Dec. 1998).

Ravikumar et al., "Star-Graph Based Multistage Interconnection Network for ATM Switch Fabric," Parallel and Distributed Processing, pp. 1-8 (Oct. 26, 1994).

Postel, "Service Mappings," Network Working Group, RFC 795, pp. 1-6 (Sep. 1981).

"Internet Protocol: Darpa Internet Program Potocol Specification," Information Sciences Institue, RFC 791, pp. 1-97 (Sep. 1981).

Decision to grant a European patent pursuant to Article 97(1) EPC for European Patent Application No. 11742905.0 (dated Dec. 21, 2017).

Communication under Rule 71(3) EPC of Intention to Grant for European Patent Application No. 11 742 905.0 (dated Aug. 30, 2017).

Notification of Transmittal of the International Search Report and the Written Opinion of the International Searching Authority, or the Declaration for International Application No. PCT/US2017/032919 (dated Jul. 25, 2017).

Communication pursuant to Article 94(3) EPC for European Patent Application No. 11 742 905.0 (dated Dec. 21, 2016).

(56) References Cited

OTHER PUBLICATIONS

"3rd Generation Partnership Project; Technical Specification Group Services and System Aspects; IP Multimedia Subsystem (IMS); Stage 2 (Release 13)," 3GPPP TS 23.228, V13.5.0, pp. 1-314 (Mar. 2016).
Change Request for 3GPP TS 29.272, "Support of the Session-Priority AVP over S6a Interface," version 13.2.0, 3GPP, C4-151285 Vancouver, Canada, pp. 1-22 (Aug. 17-21, 2015).
International Search Report for U.S. Patent Application Serial No. PCT/US2017/066331 (dated Mar. 8, 2018).
Vencore Labs et al., "Support for Signaling Transport Level Packet Marking," 3GPP Draft; C4-173152 Support for DSCP Marking 29.283 Rel14, 3rd Generation Partnership Project (3GPP), V14.1.0. pp. 1-3 (May 15, 2017).
Commonly-assigned, co-pending U.S. Appl. No. 15/214,899 for "Methods, Systems, and Computer Readable Media for Providing End-to-End Priority Service in Long Term Evolution (LTE) or Subsequent Generation Networks," (Unpublished, filed Jul. 22, 2016).
"Universal Mobile Telecommunications System (UMTS); LTE; Characteristics of the Universal Subscriber Identity Module (USIM) application," ETSI TS 131 102, 3GPP TS 31.102 verstion 13.3.0 Release 13, pp. 1-277 (Apr. 2016).
Farjardo et al., "Diameter Base Protocol," RFC 6733, pp. 1-153 (Oct. 2012).
"3rd Generation Partnership Project; Technical Specification Group Services and System Aspects; General Packet Radio Service (GPRS) enhancements for Evolved Universal Terrestrial Radio Access Network (E-UTRAN) access (Release 10)," Technical Specification, 3GPP TS 23.401 V10.4.0, pp. 1-281 (Jun. 2011).
"LTE; Evolved Universal Terrestrial Radio Access Network (E-UTRAN); S1 Application Protocol (S1AP) (3GPP TS 36.413 version 10.2.0)," ETSI TS 136 413 V10.2.0, pp. 1-259 (Jun. 2011).
"3rd Generation Partnership Project; Technical Specification Group Core Network and Terminals; Organization of subscriber data (Release 9)," Technical Specification, 3GPP TS 23.008 V9.3.0, pp. 1-97 (Jun. 2010).
"3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 8)," 3GPP TS 29.274 V8.0.0, pp. 1-131 (Dec. 2008).
"3rd Generation Partnership Project; Technical Specification Group Services and System Aspects; Priority service guide; (Release 8)," 3GPP TR 22.952 V8.0.0, pp. 1-53 (Dec. 2008).
"3rd Generation Partnership Project; Technical Specification Group Radio Access Network; Evolved Universal Terrestrial Radio Access (E-UTRA) Radio Resource Control (RRC); Protocol specification (Release 8)," 3GPP TS 36.331 V8.0.0, pp. 1-56 (Dec. 2007).
First Examination Report for Indian Patent Application Serial No. 6919/CHENP/2012 (dated Sep. 25, 2018).
Applicant-Initiated Interview Summary for U.S. Appl. No. 15/217,899 (dated Jan. 14, 2019).
Non-Final Office Action for U.S. Appl. No. 15/217,899 (dated Aug. 31, 2018).
Notice of Allowance and Fee(s) Due for U.S. Appl. No. 15/217,899 (dated Jan. 24, 2019)
Communication of European publication number and information on the application of Article 67(3) EPC for European Patent Application Serial No. 17726775.4 (dated Mar. 13, 2019).

* cited by examiner

METHODS, SYSTEMS, AND COMPUTER READABLE MEDIA FOR PRIORITY ROUTING OF DIAMETER MESSAGES

TECHNICAL FIELD

The subject matter described herein relates to methods and systems for routing Diameter messages. More particularly, the subject matter described herein relates to methods, systems, and computer readable media for routing Diameter messages using Diameter Routing Message Priority (DRMP) priority values.

BACKGROUND

The Diameter Overload Indication Conveyance (DOIC) solution for Diameter overload control introduces scenarios where Diameter routing decisions made by Diameter nodes can be influenced by the overload state of other Diameter nodes. This includes the scenarios where Diameter endpoints and Diameter Agents can throttle requests as a result of the target for the request being overloaded. In some systems, all requests have the same probability of being throttled, which can cause issues. For instance, a system operator may want to reduce the probability of transactions involving first responders being throttled during overload scenarios caused, for example, by a period of heavy signaling resulting from a natural disaster. Internet Engineering Task Force (IETF) Request for Comments (RFC) 7944 defines a mechanism, Diameter Routing Message Priority (DRMP), to allow Diameter endpoints to indicate the relative priority of Diameter transactions. With this information, Diameter nodes can factor that priority into routing, resource allocation, and overload abatement decisions.

Accordingly, there exists a need for methods, systems, and computer readable media for routing Diameter messages using Diameter Routing Message Priority (DRMP) priority values and for extending DRMP usage to realize the possibilities enabled by DRMP.

SUMMARY

This specification describes methods, systems, and computer readable media for priority routing of Diameter messages. In some examples, a method includes determining a Diameter Routing Message Priority (DRMP) priority value for a Diameter message. The method includes marking each of one or more Internet protocol (IP) packets carrying the Diameter message with an IP quality of service (QoS) value for the Diameter message based on the DRMP priority value. The method includes sending the one or more IP packets carrying the Diameter message to a destination Diameter node by way of an IP router on a data communications network providing quality of service using IP QoS values.

In some examples, a system includes a Diameter node including at least one processor. The system includes a Diameter-to-IP priority mapper implemented on the Diameter node. The Diameter-to-IP priority mapper is configured for determining a Diameter Routing Message Priority (DRMP) priority value for a Diameter message; marking each of one or more Internet protocol (IP) packets carrying the Diameter message with an IP quality of service (QoS) value for the Diameter message based on the DRMP priority value; and sending the one or more IP packets carrying the Diameter message to a destination Diameter node by way of an IP router on a data communications network providing quality of service using IP QoS values.

In some examples, the IP router on the data communications network provides quality of service using differentiated services, and the method comprises determining the IP QoS value as a differentiated services code point (DSCP) value for the Diameter message based on the DRMP priority value and a mapping of DRMP priority values to DSCP code points. Marking each of the one or more IP packets carrying the Diameter message can include inserting the DSCP value into a differentiated services field in a header of each IP packet. In some other examples, the IP router on the data communications network provides quality of service using Integrated services, and the method includes determining the IP QoS value as an Integrated services flow specification based on the DRMP priority value.

In some examples, the Diameter node is a Diameter Routing Agent (DRA), and determining the DRMP priority value for the Diameter message includes receiving the Diameter message and extracting the DRMP priority value from an attribute-value pair of the Diameter message reserved for DRMP priority values. In some other examples, the Diameter node is a Diameter client or Diameter server originating the Diameter message, and determining the DRMP priority value for the Diameter message comprises determining the DRMP priority value based on one or more other attribute-value pairs of the Diameter message.

In some examples, the Diameter node is configured for carrying signaling traffic for a telecommunications network including a long term evolution (LTE) and/or IP multimedia system (IMS) network. The method can include determining a subscriber identifier for the telecommunications network associated with the Diameter message and determining the IP QoS value for the Diameter message by mapping the DRMP priority value to the IP QoS value using a mapping, supplied by an operator of the LTE and/or IMS network, of DRMP priority values to IP QoS values for a service plan for the subscriber identifier.

The features described in this specification may be implemented using any appropriate combination of computing components, for example, hardware, software, and firmware. The terms "function" "node" or "module" refer to hardware, which may also include software and/or firmware components, for implementing the feature being described. In some examples, the features described in this specification may be implemented using a computer readable medium storing computer executable instructions that when executed by at least one processor of a computer control the computer to perform operations. Examples of appropriate computer readable media include non-transitory computer-readable media, such as disk memory devices, chip memory devices, programmable logic devices, and application specific integrated circuits. A computer readable medium may be located on a single device or computing platform or may be distributed across multiple devices or computing platforms.

DETAILED DESCRIPTION

This specification describes methods, systems, and computer readable media for extending DRMP usage at Diameter nodes to IP routing of Diameter messages through an IP network. IP networks can provide quality of service (QoS) using, for example, differentiated services (DiffServ) or integrated services (IntServ). Generally DiffServ is used to provide specific traffic routing treatment to IP packets in the IP network, which defines the per-hop behavior applied on packet during routing. The introduction of DRMP can aid in appropriately addressing Diameter message treatment behavior at Diameter nodes but still lacks a mechanism for addressing similar treatment over IP networks.

DiffServ specifies a DS field for IP headers (e.g., ToS Field in IPv4 header and Traffic Class field in IPv6 header). The DS field is used by DiffServ routers to determine the QoS forwarding requirements of the packets. For a packet to be receive consistent per-hop behavior treatment while traversing an IP network, Diameter nodes can be configured with a mapping between DRMP values to IP QoS values, so that IP routers in the IP network can prioritize routing decisions using the IP QoS values based on DRMP values.

Configuring Diameter nodes to map DRMP values to IP QoS values can provide one or more of the following advantages: 1) DRMP priority values are extended beyond the Diameter protocol and Diameter node scope, which can facilitate improved IP routing experience to telecommunications signaling traffic; and 2) telecommunications service operators have configuration flexibility to map DRMP priority values to IP QoS values, which can enhance the Diameter messages in-flight experience over the IP network.

Figure 1A:
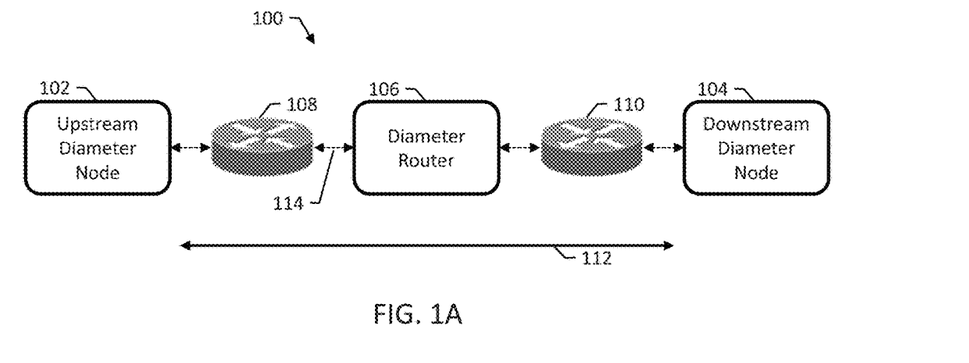
FIGS. 1A and 1B illustrate example networks where DRMP usage at Diameter nodes can be extended to IP routing of Diameter messages through an IP network.
Figure 1B:
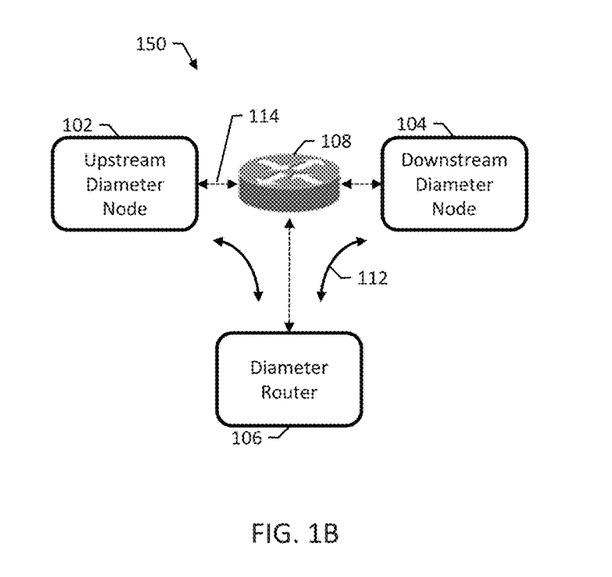

FIGS. 1A and 1B illustrate example networks where DRMP usage at Diameter nodes can be extended to IP routing of Diameter messages through an IP network. FIG. 1A shows a first network 100 including an upstream Diameter node 102 communicating with a downstream Diameter node 104 by way of a Diameter router 106. Upstream Diameter node 102 is coupled to Diameter router 106 by an IP router 108 of an IP network, and downstream Diameter node 104 is coupled to Diameter router 106 by another IP router 110.

In operation, upstream and downstream Diameter nodes 102 and 104 exchange Diameter messages 112 by sending IP packets 114 that traverse IP routers 108 and 110 and Diameter router 106. FIG. 1B shows a second network 150, similar to first network 100, where upstream and downstream Diameter nodes 102 and 104 exchange Diameter messages by way of IP router 108 and Diameter router 106. Diameter router 106 receives IP packets carrying Diameter messages from IP router 108 and can return those IP packets back to IP router 108 for appropriate routing. First and second networks 100 and 150 are example networks that can be used, for example, in a telecommunications network for carrying signaling information using the Diameter protocol.

Diameter is a networking protocol that evolved from RADIUS for authentication, authorization, and accounting. Diameter applications extend the base protocol by adding new commands and attributes, e.g., commands and attributes for use in policy and charging control. A typical Diameter message includes a Diameter header and a variable number of attribute-value pairs (AVPs) for encapsulating information relevant to the Diameter message.

Diameter router 106 can be implemented as a system of one or more computers executing software for routing Diameter messages. For example, Diameter router 106 may be implemented on a computing platform that includes one or more processor blades, each implementing a routing agent or other function. Diameter router 106 may be implemented in a distributed computing system, e.g., executing on a virtual machine, or any appropriate system of one or more computers.

Similarly, Diameter nodes 102 and 104 can each be implemented as a computer system programmed for originating and processing received Diameter messages. For example, Diameter nodes 102 and 104 may be Diameter clients or servers, or Diameter Edge Agents, executing on virtual machines of a distributed computing system, for long term evolution (LTE) and IP multimedia system (IMS) networks. Examples of Diameter messages carrying signaling traffic for a telecommunications network include Diameter messages related to policy, subscriber data, a network resource utilization.

Each of upstream Diameter node 102, downstream Diameter node 104, and Diameter router 106 is configured for using DRMP. For purposes of illustration, consider an example where downstream Diameter node 104 originates a Diameter message addressed to upstream Diameter node 102. Downstream Diameter node 104 assigns a DRMP priority value to that Diameter message. The DRMP priority value can be in a range from PRIORITY_0 (lowest priority) to PRIORITY_15 (highest priority). The method of determining the DRMP priority value is application-specific.

For example, higher DRMP priority values can be assigned to Diameter messages for first-responder-related signaling after natural disasters or to emergency-call-related signaling. In another example, a network operator may desire to differentiate network-based services by providing a service level agreement (SLA) that includes preferential Diameter routing behavior, e.g., by offering platinum, gold, and silver levels of service. DRMP priority values can be assigned based on the selected service level of a subscriber.

Downstream Diameter node 104 inserts the DRMP priority value into the Diameter message as an AVP in an appropriate location. The DRMP (AVP code 301) is of type Enumerated. Downstream Diameter node 104 inserts other AVP pairs into the Diameter message as appropriate for the application.

Downstream Diameter node 104 sends the Diameter message to upstream Diameter node 102 by way of Diameter router 106, which is configured for compliance with DRMP and will process the Diameter message according to the DRMP priority value. IP routers 108 and 110, however, will route the IP packets carrying the Diameter messages without regard to the DRMP priority value. To extend DRMP usage to IP routing of the Diameter message, downstream Diameter node 104 marks the IP packets carrying the Diameter message with an IP quality of service (QoS) value for the Diameter message based on the DRMP priority value.

For example, suppose that IP routers 108 and 110 provide quality of service using DiffServ. Downstream Diameter node 104 can determine the IP QoS value as a DSCP value based on the DRMP priority value and a mapping of DRMP priority values to DSCP code points. Downstream Diameter node 104 marks the IP packets carrying the Diameter message comprises inserting the DSCP value into a differentiated services field in a header of each IP packet.

In another example, IP routers 108 and 110 provide quality of service using Integrated Services, and downstream Diameter node 104 determines the IP QoS value as an Integrated Services flow specification based on the DRMP priority value. Downstream Diameter node 104 can use any appropriate IP QoS for the IP network.

Downstream Diameter node 104 sends the IP packets carrying the Diameter message to Diameter router 106 by way of IP router 108. IP router 108 uses the IP QoS value inserted into the IP packets to appropriate prioritize the routing of the IP packets. Diameter router 106 receives the Diameter message and extracts the DRMP priority value from the AVP of the Diameter message reserved for DRMP priority values. Diameter router 106 then uses the DRMP priority value to appropriately prioritize the routing of the Diameter message.

Diameter router 106 marks the outgoing IP packets carrying the Diameter message to IP router 110 with the IP QoS value. For example, Diameter router 106 can determine the IP QoS value using a local mapping between DRMP values and IP QoS values. In another example, Diameter router 106 can determine the IP QoS value by copying the IP QoS value of the IP packets received from IP router 108.

Diameter router 106 sends the outgoing IP packets either to IP router 110 (in first example network 100, as shown in FIG. 1A) or back to IP router 108 (in second example network 150, as shown in FIG. 1B). The outgoing IP packets are appropriately prioritized during IP routing. Upstream Diameter node 102 receives the Diameter message. Depending on the application, upstream Diameter node 102 may use the DRMP priority value in processing the Diameter message.

Figure 2:
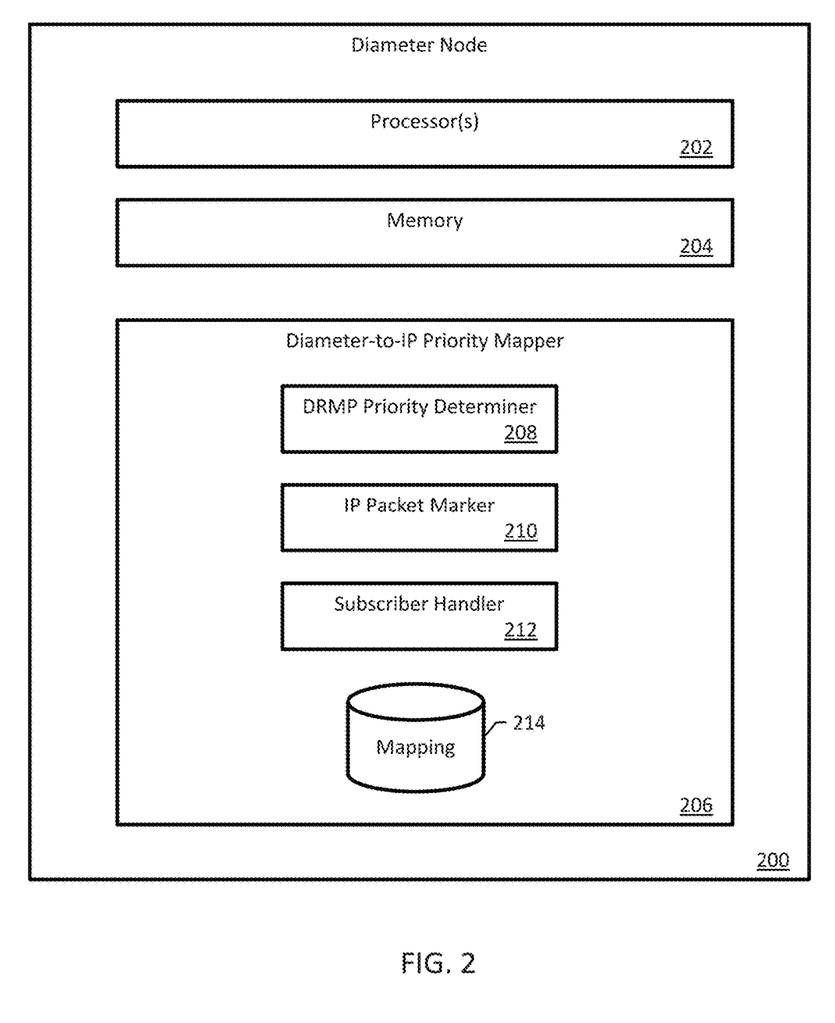
FIG. 2 is a block diagram of an example DRMP-configured Diameter node.

FIG. 2 is a block diagram of an example DRMP-configured Diameter node 200. Diameter node 200 is implemented as a computer system comprising one or more processors 202 and memory 204 storing executable instructions for processors 202. Diameter node 200 may be a Diameter Routing Agent (DRA), or a Diameter client or Diameter server, for example.

Diameter node 200 includes a Diameter-to-IP priority mapper 206 implemented on processors 202 and memory 204, e.g. as one or more computer programs. Diameter-to-IP priority mapper 206 includes a DRMP priority determiner 208 and an IP packet marker 210 for determining DRMP priority values and marking IP packets with IP QoS values. Diameter-to-IP priority mapper can include an optional subscriber handler 212 for performing subscriber-specific mappings between DRMP priority values and IP QoS values.

Diameter-to-IP priority mapper 206 includes a mapping 214 between DRMP priority values and IP QoS values. Mapping 214 may be populated, e.g., by a network operator, or may store default values for specific IP QoS systems such as DiffServ. Mapping 214 can be implemented, for example, as a table indexed by DRMP priority values, where each entry in the table for a DRMP priority value specifies a corresponding IP QoS value. Table 1, below, is an example of a table indexed by DRMP priority values that maps the DRMP priority values to DSCP values.

TABLE 1

Mappings from DRMP Priority Values to DSCP Priority Values

| DRMP Priority Value | DSCP Value |
|---|---|
| PRIORITY_0 | DSCP_0 |
| PRIORITY_1 | DSCP_1 |
| PRIORITY_2 | DSCP_2 |
| PRIORITY_3 | DSCP_3 |
| PRIORITY_4 | DSCP_4 |
| PRIORITY_5 | DSCP_5 |
| PRIORITY_6 | DSCP_6 |
| PRIORITY_7 | DSCP_7 |
| PRIORITY_8 | DSCP_8 |
| PRIORITY_9 | DSCP_9 |
| PRIORITY_10 | DSCP_10 |
| PRIORITY_11 | DSCP_11 |
| PRIORITY_12 | DSCP_12 |
| PRIORITY_13 | DSCP_13 |
| PRIORITY_14 | DSCP_14 |
| PRIORITY_15 | DSCP_15 |

For instance, Diameter-to-IP priority mapper 206 using the mapping illustrated in Table 1 would map a Diameter message having a DRMP priority value of PRIORITY_5 to a DSCP value of DSCP_5. Mapping 214 can alternatively be implemented in any appropriate manner, e.g., by a formula or series of operations to transform a DRMP priority value to an IP QoS value.

In operation, Diameter-to-IP priority mapper 206 takes a DRMP priority value, applies the DRMP priority value to mapping 214 as appropriate for mapping 214, and retrieves the corresponding IP QoS value for the DRMP priority value. For example, suppose that mapping 214 is implemented as a table indexed by DRMP priority values. Diameter-to-IP priority mapper 206 performs a look-up in the table using a DRMP priority value and then retrieves the IP QoS value of the entry returned by the look-up.

When Diameter node 200 processes a Diameter message, DRMP priority determiner 208 determines a DRMP priority value for the Diameter message. For example, if Diameter node 200 is originating the Diameter message, DRMP priority determiner 208 assigns the Diameter message an application-specific DRMP priority value. In another example, if Diameter node 200 is receiving the Diameter message, DRMP priority determiner 208 extracts the DRMP priority value from an AVP of the Diameter message reserved for DRMP priority values.

To illustrate assigning an application-specific DRMP priority value, consider the following examples. Natural disasters can result in a considerable increase in usage of network resources and, in some cases, loss of network capacity, e.g., where network equipment is damaged. The combination of added load and reduced capacity can lead to Diameter node 200 becoming overloaded.

In this case, signaling associated with first responders can be given a higher priority to help ensure they can most effectively do their jobs. The United States wireless priority services (WPS) and government emergency telecommunications service (GETS) are examples of systems designed to address the command and control aspects of these first responder needs. By assigning higher DRMP priority values to Diameter messages for first-responder-related signaling after natural disasters, first responders and other individuals responsible for handling the after effects of the disaster can have a better chance of gaining access to the network resources in order to communicate both between themselves and with other network resources.

In another example, consider the signaling associated with emergency calls. Although these calls may not tax the network with the same level of severity as natural disasters, emergency calls are still critical to safety. By assigning higher DRMP priority values to Diameter messages for emergency calls, DRMP priority determiner 208 can improve the chances of the emergency calls being successfully completed.

IP packet marker 210 marks outgoing IP packets carrying an outgoing Diameter message with an IP QoS value for the outgoing Diameter message based on the DRMP priority value for the outgoing Diameter message. The DRMP priority value is determined by DRMP priority determiner 208. Typically, IP packet marker 210 inserts the IP QoS value into a header of each outgoing IP packet. For example, if the IP QoS value is DSCP value, IP packet marker 210 can insert the DSCP value into a DiffServ field in a header of each IP packet.

Subscriber handler 212 is configured for performing subscriber-specific mappings between DRMP priority values and IP QoS values. For example, suppose that Diameter node 200 is configured for carrying signaling traffic for a telecommunications network, e.g., a long term evolution (LTE) and/or IP multimedia system (IMS) network. Subscriber handler 212 can determine a subscriber identifier for the telecommunications network associated with a Diameter message.

For example, subscriber handler 212 can determine the subscriber identifier by extracting the subscriber identifier from an appropriate AVP of the Diameter message. Then, subscriber handler 212 can determine the IP QoS value using a mapping, supplied by an operator of the LTE and/or IMS network, of DRMP priority values to IP QoS values for the subscriber. For example, the operator can supply mappings for various service plans, and subscriber handler 212 can using the mapping for the service plan for the subscriber identifier.

To illustrate an example of different mappings, consider the example of three different mappings illustrating in Table 2.

TABLE 2

Subscriber-specific mappings

| DRMP Priority Value | DSCP Value - Silver | DSCP Value - Gold | DSCP Value - Platinum |
| --- | --- | --- | --- |
| PRIORITY_0 | DSCP_2 | DSCP_1 | DSCP_0 |
| PRIORITY_1 | DSCP_2 | DSCP_1 | DSCP_0 |
| PRIORITY_2 | DSCP_2 | DSCP_1 | DSCP_0 |
| PRIORITY_3 | DSCP_2 | DSCP_1 | DSCP_0 |
| PRIORITY_4 | DSCP_3 | DSCP_2 | DSCP_1 |
| PRIORITY_5 | DSCP_3 | DSCP_2 | DSCP_1 |
| PRIORITY_6 | DSCP_3 | DSCP_2 | DSCP_1 |
| PRIORITY_7 | DSCP_3 | DSCP_2 | DSCP_1 |
| PRIORITY_8 | DSCP_4 | DSCP_3 | DSCP_2 |
| PRIORITY_9 | DSCP_4 | DSCP_3 | DSCP_2 |
| PRIORITY_10 | DSCP_4 | DSCP_3 | DSCP_2 |
| PRIORITY_11 | DSCP_4 | DSCP_3 | DSCP_2 |
| PRIORITY_12 | DSCP_5 | DSCP_4 | DSCP_3 |
| PRIORITY_13 | DSCP_5 | DSCP_4 | DSCP_3 |
| PRIORITY_14 | DSCP_5 | DSCP_4 | DSCP_3 |
| PRIORITY_15 | DSCP_5 | DSCP_4 | DSCP_3 |

As shown in Table 2, a network operator provides three subscriber-specific mappings for three levels of service: silver, gold, and platinum. The IP networks support six different DSCP values: DSCP_0-DSCP_5. Diameter messages for subscribers of the platinum service agreement are given DSCP values from DSCP_0-DSCP_3, Diameter messages for subscribers of the gold service agreement are given DSCP values from DSCP_1-DSCP_4, and Diameter message for subscribers of the silver service agreement are given DSCP values from DSCP_2 to DSCP_5.

For example, suppose that Diameter node 200 receives a Diameter message and that DRMP priority determiner 208 determines that the Diameter message has a DRMP priority value of PRIORITY_8. Subscriber handler 212 can determine the subscriber identifier for the Diameter message and then determine, e.g., by accessing a local or remote database storing service level agreements for subscribers, the service level agreement associated with the subscriber identifier.

If the service level agreement is platinum, then Diameter-to-IP priority mapper 206 maps the DRMP priority value of PRIORITY_8 to DSCP value DSCP_2. If the service level agreement is gold, then Diameter-to-IP priority mapper 206 maps the DRMP priority value of PRIORITY_8 to DSCP value DSCP_3. If the service level agreement is silver, then Diameter-to-IP priority mapper 206 maps the DRMP priority value of PRIORITY_8 to DSCP value DSCP_4.

Diameter node 200 is a DRMP-configured Diameter node in that Diameter node 200 is configured for processing Diameter messages containing DRMP AVPs. In general, Diameter node 200 includes DRMP priority values in the DRMP AVP in all Diameter request messages, and when available, Diameter node 200 uses DRMP priority values the DRMP AVP when making Diameter overload throttling decisions.

Diameter node 200 is configured with a default priority to apply to Diameter message of transactions that do not have a pre-configured DRMP priority value. For example, Diameter node 200 can be configured to use the PRIORITY_10 priority as the default value. Diameter node 200 can support the ability for the default priority to be modified through local configuration interfaces.

In some examples, Diameter node 200 is DRMP-configured in that Diameter node 200 is programmed to use DRMP priority values when relaying request and answer messages. For example, Diameter node 200 can use DRMP priority values in the selection of routes and the ordering of messages relayed.

For Diameter node 200 to effectively carry out DRMP operations, the priorities defined for messages across different applications used in the Diameter administrative domain for Diameter node 200 should be defined in a consistent and coordinated fashion in view of the default priorities. Otherwise, it may be possible for messages for one application to gain unwarranted preferential treatment for other applications.

Moreover, with the Diameter administrative domain, the Diameter nodes capable of modifying DRMP AVPs will normally be trusted nodes. Misbehaving nodes would have the ability to use the DRMP mechanism to gain unwarranted preferential treatment.

When Diameter node 200 sends Diameter messages that cross Diameter administrative boundaries, Diameter node 200 can be configured to strip or modify the DRMP priority values in those messages. This can avoid a problem where the priority definitions vary between the two Diameter administrative domains, which could allow Diameter messages to gain unwarranted preferential treatment.

In some examples, where Diameter node 200 is a Diameter endpoint, Diameter node 200 can be programmed to use DRMP priority values to make resource allocation decisions. For instance, suppose that Diameter node 200 is a Diameter server. Diameter node 200 can be programmed to use DRMP priority values to treat higher-priority requests ahead of lower-priority requests. In another example, Diameter node 200 can be programmed to use DRMP priority values to fail a Diameter request as a result of insufficient resources.

Figure 3:
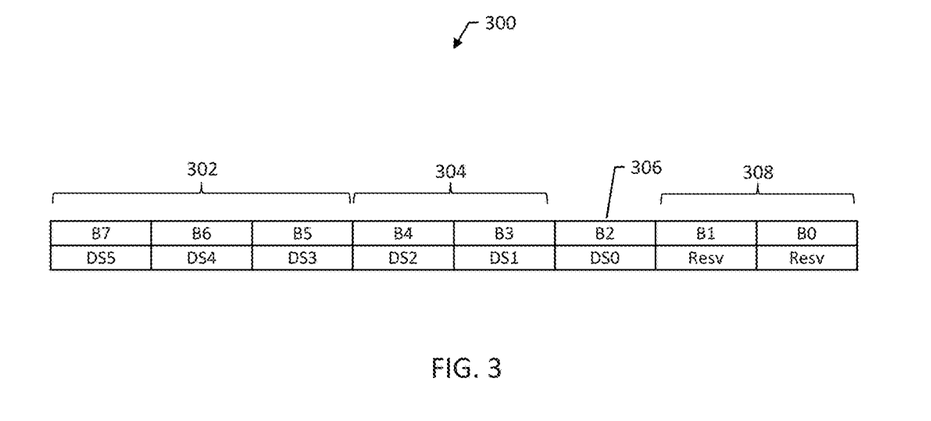
FIG. 3 is a diagram of an example DSCP field layout.

FIG. 3 is a diagram of an example DSCP field layout 300. DSCP is an example of an IP QoS system that can be used for extending DRMP usage at Diameter nodes to IP routing of Diameter messages through an IP network. One or more IP packets carrying a Diameter message can be marked with DSCP values in the headers of the IP packets. For example, the IP packets can be marked in the ToS Byte field of the headers of the IP packets.

DiffServ is a computer networking architecture that specifies a mechanism for classifying and managing network traffic. In particular, DiffServ provides a scalable mechanism for providing QoS on various types of IP networks. For instance, a computer network can be configured to use DiffServ to provide low-latency to critical network traffic such as voice or video streaming. The same computer network can be configured, using DiffServ, to provide best-effort service to non-critical services such as web traffic or file transfers.

DiffServ typically uses a six bit DSCP value in the eight bit differentiated services (DS) field in the IP header for the purpose of classifying IP packets. The DS field and explicit congestion notification (ECN) replace the IPv4 TOS field, although that field may still be used in some networks. DSCP field layout 300 shows the DSCP bits of the ToS Byte field. Bits B5-B7 302 represent the DSCP categories. Bits B3-B4 304 represent the drop probability. B2 306 is set to zero and the remaining bits 308, B0-B1, are reserved.

DiffServ relies on a mechanism to classify and mark packets as belonging to a specific class. For example, DRMP-enabled Diameter nodes can classify and mark IP packets carrying Diameter messages based on the DRMP priority values of those Diameter messages. DiffServ-enabled routers implement per-hop behaviors (PHBs), which define the packet-forwarding properties associated with a class of traffic. Different PHBs may be defined to offer, for example, low-loss or low-latency.

In a network implementing DiffServ, routers on the network can be configured to differentiate IP packets based on the marked DSCP bits for those packets. Each traffic class can be managed on a class-specific basis, e.g., so that priority treatment can be given to higher-priority traffic on the network. In some examples, the high overhead functions of packet classification and policing can be implemented at the edge of the network by edge routers, e.g., so that the edge routers mark the packets with DSCP bits and core routers can be relieved of the marking.

The DiffServ RFCs recommend certain encodings. Since the encodings are recommended and not required, this gives a network operator flexibility in defining traffic classes. In some example, networks can use the following commonly defined Per-Hop Behaviors:

Default PHB—best-effort traffic
Expedited Forwarding (EF) PHB—a class above default for low-loss, low-latency traffic
Assured Forwarding (AF) PHB—to assure delivery under certain conditions
Class Selector PHBs—for backward compatibility with the IP precedence field, which is used in IPv4 networks in the TOS byte of the IPv4 header to mark priority traffic.

The core routers can implement PHB treatment using any technique or appropriate combination of techniques. For example, the core routers can use a combination of scheduling policy and queue management policy.

DSCP bits can be set using any appropriate method. For example, DSCP bits can be set at interface, port, or per packet level using Linux utilities. Linux utilities such as socket application programming interfaces (APIs) or iptables can configure a DSCP codepoint for a desired target, e.g., a desired interface or port. iptables is a flexible firewall utility built for Linux operating systems. iptables is a userspace application program that allows a system administrator to configure port and interface tables provided by the Linux kernel firewall, and other applications.

Using the utilities, however, fixes the DSCP value to the interface or port, so that traffic routed through that interface or port gets marked, which may not be useful in addressing the flexibility needed to DSCP marking on a per-packet basis.

Providing DSCP marking on a per-packet basis may be useful in reducing the need of reserving dedicated system resources. For example, implementing DSCP marking using the Linux utilities described above would normally requiring reserving a port, interface, or IP address, just to facilitate the DSCP marking. Providing DSCP marking on a per-packet basis (e.g., in the IP packet marker 210 of FIG. 2) avoids this need to reserve a port, interface, or IP address.

Although DSCP is described in detail with reference to FIG. 3, the methods, systems, and computer readable media described in this specification for extending DRMP usage to IP routing of Diameter messages can use any appropriate IP QoS system. For example, IntServ is another IP QoS system. DiffServ is a coarse-grained, class-based mechanism for traffic management, whereas IntServ is a fine-grained, flow-based mechanism.

In a network implementing IntServ, every router in the system implements IntServ, and every application that requires some kind of guarantees has to make an individual reservation. Flow specifications describe how the reservation will be used, and RSVP provides the mechanism for signaling the reservation across the network. Extending DRMP to networks using IntServ may require more computing resources than extending DRMP to networks using DiffServ since the Diameter nodes mapping DRMP priority values to IP QoS values would need to be programmed to make the appropriate reservations.

Figure 4:
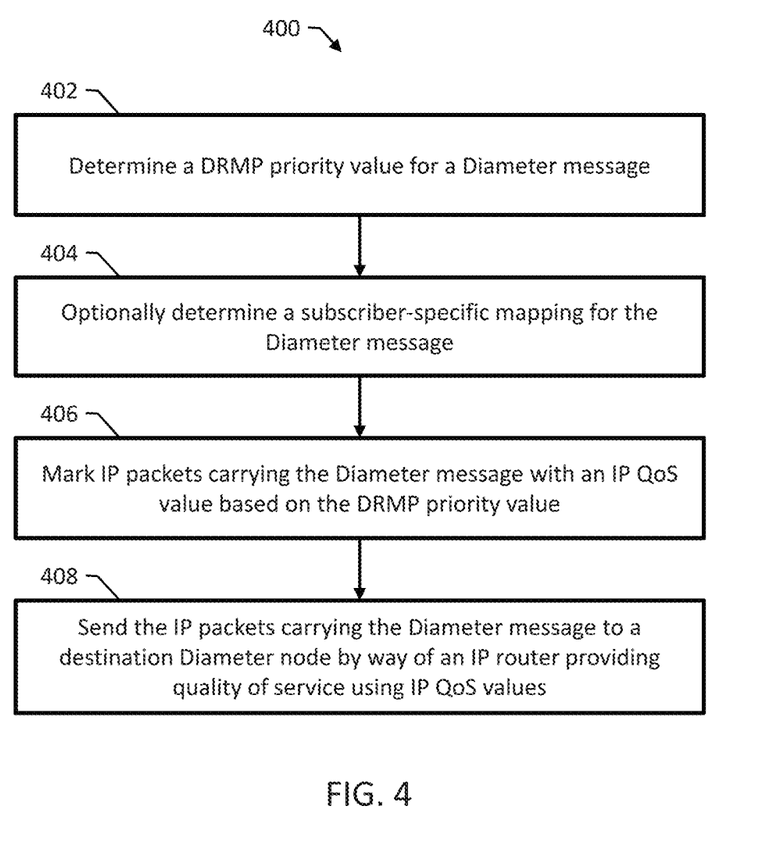
FIG. 4 is a flow diagram of an example method for priority routing of Diameter messages.

FIG. 4 is a flow diagram of an example method 400 for priority routing of Diameter messages. Method 400 can be performed by the Diameter node 200 of FIG. 2 or any appropriate computer system.

Method 400 includes determining a DRMP priority value for a Diameter message (402). For example, suppose that the Diameter node is a DRA. Determining the DRMP priority value for the Diameter message can include receiving the Diameter message and extracting the DRMP priority value from an attribute-value pair of the Diameter message reserved for DRMP priority values.

In another example, the Diameter node is a Diameter client or server originating the Diameter message, and determining the DRMP priority value for the Diameter message includes determining the DRMP priority value based on one or more other attribute-value pairs of the Diameter message, i.e., so that the DRMP priority value is application-specific.

Method 400 includes optionally determining a subscriber-specific mapping between DRMP priority values and IP QoS values for the Diameter message (404). For example, suppose that the Diameter node is configured for carrying signaling traffic for a telecommunications network comprising a long term evolution (LTE) and/or IP multimedia system (IMS) network.

Method 400 can include determining a subscriber identifier for the telecommunications network associated with the Diameter message and determining the IP QoS value for the Diameter message by mapping the DRMP priority value to the IP QoS value using a mapping, supplied by an operator of the LTE and/or IMS network, of DRMP priority values to IP QoS values for a service plan for the subscriber identifier.

Method 400 includes marking each of one or more IP packets carrying the Diameter message with an IP QoS value for the Diameter message based on the DRMP priority value (406). For example, suppose that an IP router on the route provides quality of service using DiffServ. Method 400 can include determining the IP QoS value as a DSCP value for the Diameter message based on the DRMP priority value and a mapping of DRMP priority values to DSCP code points, and marking each of the one or more IP packets carrying the Diameter message comprises inserting the DSCP value into a differentiated services field in a header of each IP packet.

In another example, the IP router provides quality of service using integrated services, and method 400 includes determining the IP QoS value as an Integrated services flow specification based on the DRMP priority value.

Method 400 includes sending the one or more IP packets carrying the Diameter message to a destination Diameter node by way of an IP router on a data communications network providing quality of service using IP QoS values (408). As a result, DRMP usage at Diameter nodes is extended to IP routing of Diameter messages through an IP network.

Figure 5:
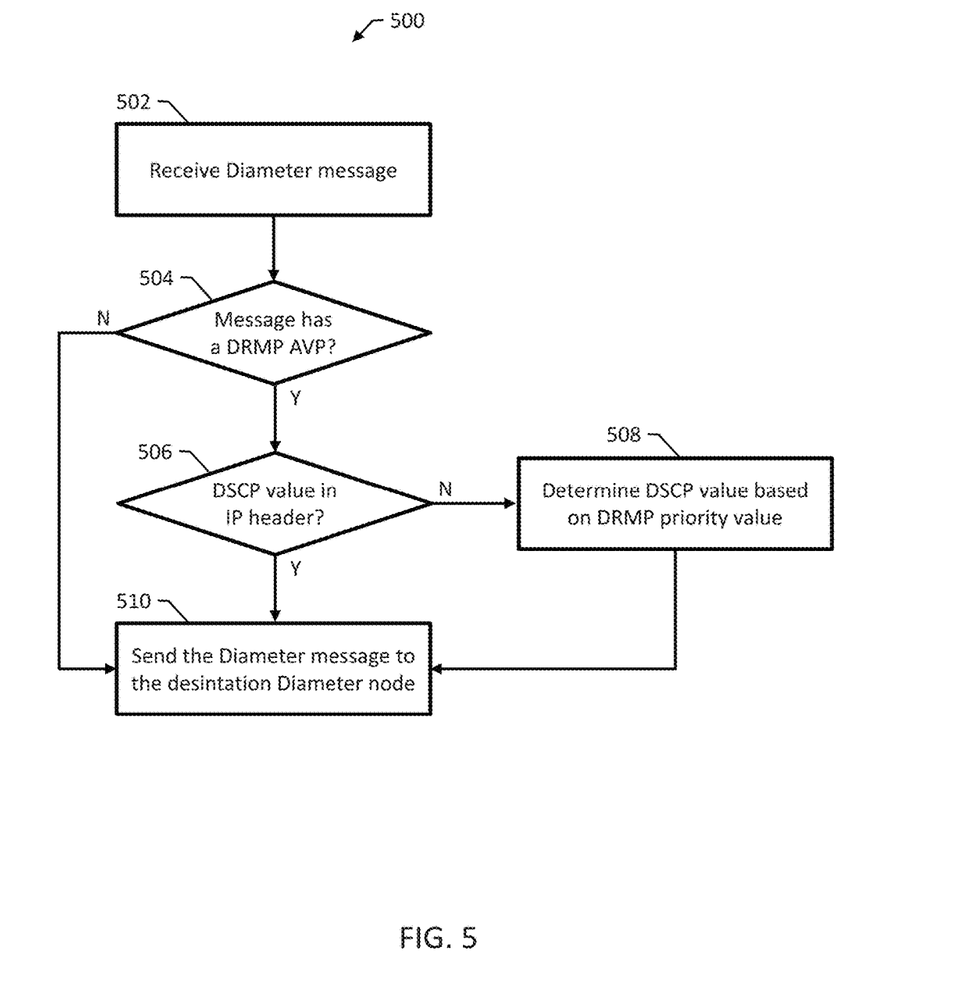
FIG. 5 is a flow diagram of an example method for priority routing of Diameter messages using DSCP.

FIG. 5 is a flow diagram of an example method 500 for priority routing of Diameter messages using DSCP. Method 500 can be performed by a Diameter Routing Agent (DRA) any appropriate computer system.

Method 500 includes receiving a Diameter message (502). In some Diameter networks, some Diameter nodes may be configured to use DRMP and some other Diameter nodes may not be configured to use DRMP. For example, some Diameter networks may include Diameter nodes that are awaiting an upgrade or that purposefully lack DRMP capability for purposes of, e.g., reduction of cost or complexity.

So method 500 includes determining whether or not the Diameter message has a DRMP AVP value (504). For example, determining whether or not the Diameter message has a DRMP AVP value can include searching the AVP values of the Diameter message for the AVP reserved for DRMP priority values. If the Diameter message does not include a DRMP AVP value, then method 500 includes processing the Diameter message as if it were a legacy message (proceed to 510), i.e., without marking IP packets carrying the Diameter message with DSCP values. The Diameter message may lack a DRMP AVP value if the originating Diameter node is not configured to use DRMP.

If the Diameter message does include a DRMP AVP value, the method 500 includes determining a DSCP value for the Diameter message (proceed to 506). Method 500 includes determining whether there is a DSCP value in one or more headers of the incoming IP packets carrying the Diameter message (506). If the incoming IP packets include a DSCP value in the headers of the incoming IP packets, then method 500 includes using the DSCP value of the incoming IP packets for the outgoing IP packets (proceed to 510).

If the incoming IP packets carrying the Diameter message lack a DSCP value in the headers of the incoming IP packets, then method 500 includes determining a DSCP value for the Diameter message using the DRMP priority value from the DRMP AVP (508). The incoming IP packets may lack DSCP values, for example, if the originating Diameter node is configured for using DRMP but is not configured for extending DRMP to IP networks, e.g., as described above with reference to FIGS. 1A-4.

In that case, even though the originating Diameter node is not configured for extending DRMP to IP networks, method 500 can extend DRMP to IP networks for that Diameter message since method 500 includes routing that Diameter message. For example, determining the DSCP value for the Diameter message based on the DRMP priority value can include looking up the DRMP priority value in a mapping of DRMP priority values to DSCP values and retrieving a corresponding DSCP value for the DRMP priority value as specified in the mapping.

In that case, the mapping may not be application-specific, i.e., determining the DSCP value may include using a generic or default mapping. Alternatively, the mapping may be application-specific, and determining the DSCP value includes checking other AVPs of the Diameter message to determine the application and selecting an appropriate mapping for the application. In some examples, the mapping may be subscriber-specific, and determining the DSCP value includes determining a subscriber identifier for the Diameter message and selecting an appropriate mapping for the subscriber.

Method 500 includes sending the Diameter message to the destination Diameter node (510). If the Diameter message has a DRMP AVP, then sending the message includes prioritizing the routing of the message using the DRMP priority value and marking the outgoing IP packets carrying the Diameter message using the DSCP value based on the DRMP priority value. If the Diameter message lacks a DRMP AVP, then method 500 includes processing the Diameter message without marking IP packets carrying the Diameter message with DSCP values.

A DRA executing method 500 is thus able to route Diameter message from Diameter nodes lacking DRMP capability, DRMP-configured Diameter nodes, and DRMP-configured Diameter nodes that are also configured to extend DRMP to IP networks, for example, the DRMP-configured Diameter node 200 of FIG. 2. In a Diameter network that includes DRMP-configured nodes that are not configured to extend DRMP to IP networks, the DRA can still extend DRMP to IP networks as it routes Diameter messages that include DRMP AVPs but lack DSCP values.

Accordingly, while methods, systems, and computer readable media have been described in reference to specific examples and features, the utility of the subject matter is not thus limited, but rather extends to and encompasses numerous other variations, modifications and alternatives, as will suggest themselves to those of ordinary skill in the field of the present subject matter, based on this specification.

Various combinations and sub-combinations of the structures and features described in this specification are contemplated and will be apparent to a skilled person having knowledge of this disclosure. Any of the various features and elements disclosed may be combined with one or more other disclosed features and elements unless indicated to the contrary. Correspondingly, the subject matter as claimed is intended to be broadly construed and interpreted, as including all such variations, modifications and alternatives, within its scope and including equivalents of the claims.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for routing Diameter messages, the method comprising:
   determining, by a Diameter node comprising at least one processor, a Diameter Routing Message Priority (DRMP) priority value for a Diameter message;
   marking, by the Diameter node, each of one or more Internet protocol (IP) packets carrying the Diameter message with an IP quality of service (QoS) value for the Diameter message based on the DRMP priority value, including determining the IP QoS value as a differentiated services code point (DSCP) value for the Diameter message based on the DRMP priority value and a mapping of DRMP priority values to DSCP code points: and sending, by the Diameter node, the one or more IP packets carrying the Diameter message to a destination Diameter node by way of an IP router on a data communications network providing quality of service using IP QoS values± wherein the IP router on the data communications network provides Quality of service using differentiated services;
   wherein the mapping is implemented as a table indexed by DRMP priority values;
   wherein marking each of the one or more IP packets carrying the Diameter message comprises inserting the DSCP value into a differentiated services field in a header of each IP packet.

2. The method of claim 1, wherein determining the IP QoS value as a DSCP value for the Diameter message based on the DRMP priority value and the mapping of DRMP priority values to DSCP code points comprises selecting the mapping from a plurality of subscriber-specific mappings for a plurality of different levels of service.

3. The method of claim 1, wherein the Diameter node comprises a Diameter Routing Agent (DRA), and wherein determining the DRMP priority value for the Diameter message comprises receiving the Diameter message and extracting the DRMP priority value from an attribute-value pair of the Diameter message reserved for DRMP priority values.

4. The method of claim 1, wherein the Diameter node comprises a Diameter client or Diameter server originating the Diameter message, and wherein determining the DRMP priority value for the Diameter message comprises determining the DRMP priority value based on one or more other attribute-value pairs of the Diameter message.

5. The method of claim 1, wherein the Diameter node is configured for carrying signaling traffic for a telecommunications network comprising a long term evolution (LTE) and/or IP multimedia system (IMS) network.

6. The method of claim 5, comprising determining a subscriber identifier for the telecommunications network associated with the Diameter message and determining the IP QoS value for the Diameter message by selecting the mapping from a plurality of subscriber-specific mappings using the subscriber identifier.

7. A system for routing Diameter messages, the system comprising:
   a Diameter node comprising at least one processor; and a Diameter-to-IP priority mapper implemented on the Diameter node and configured for:
   determining a Diameter Routing Message Priority (DRMP) priority value for a Diameter message;
   marking each of one or more Internet protocol (IP) packets carrying the Diameter message with an IP quality of service (QoS) value for the Diameter message based on the DRMP priority value, including determining the IP QoS value as a differentiated services code point (DSCP) value for the Diameter message based on the DRMP priority value and a mapping of DRMP priority values to DSCP code points; and
   sending the one or more IP packets carrying the Diameter message to a destination Diameter node by way of an IP router on a data communications network providing quality of service using IP QoS values, wherein the IP router on the data communications network provides Quality of service using differentiated services;
   wherein the mapping is implemented as a table indexed by DRMP priority values;
   wherein marking each of the one or more IP packets carrying the Diameter message comprises inserting the DSCP value into a differentiated services field in a header of each IP packet.

8. The system of claim 7, wherein determining the IP QoS value as a DSCP value for the Diameter message based on the DRMP priority value and the mapping of DRMP priority values to DSCP code points comprises selecting the mapping from a plurality of subscriber-specific mappings for a plurality of different levels of service.

9. The system of claim 7, wherein the Diameter node comprises a Diameter Routing Agent (DRA), and wherein determining the DRMP priority value for the Diameter message comprises receiving the Diameter message and extracting the DRMP priority value from an attribute-value pair of the Diameter message reserved for DRMP priority values.

10. The system of claim 7, wherein the Diameter node comprises a Diameter client or Diameter server originating the Diameter message, and wherein determining the DRMP priority value for the Diameter message comprises determining the DRMP priority value based on one or more other attribute-value pairs of the Diameter message.

11. The system of claim 7, wherein the Diameter node is configured for carrying signaling traffic for a telecommunications network comprising a long term evolution (LTE) and/or IP multimedia system (IMS) network.

12. The system of claim 11, wherein the Diameter-to-IP priority mapper is configured for determining a subscriber identifier for the telecommunications network associated with the Diameter message and determining the IP QoS value for the Diameter message by selecting the mapping from a plurality of subscriber-specific mappings using the subscriber identifier.

13. A non-transitory computer readable medium storing executable instructions that when executed by at least one processor of a Diameter node cause the Diameter node to perform operations comprising:
   determining a Diameter Routing Message Priority (DRMP) priority value for a Diameter message;
   marking each of one or more Internet protocol (IP) packets carrying the Diameter message with an IP quality of service (QoS) value for the Diameter message based on the DRMP priority value, including determining the IP QoS value as a differentiated services code point (DSCP) value for the Diameter message based on the DRMP priority value and a mapping of DRMP priority values to DSCP code points; and
   sending the one or more IP packets carrying the Diameter message to a destination Diameter node by way of an IP router on a data communications network providing quality of service using IP QoS values, wherein the IP router on the data communications network provides Quality of service using differentiated services;

wherein the mapping is implemented as a table indexed by DRMP priority values;

wherein marking each of the one or more IP packets carrying the Diameter message comprises inserting the DSCP value into a differentiated services field in a header of each IP packet.

14. The non-transitory computer readable medium of claim 13, wherein the Diameter node is configured for carrying signaling traffic for a telecommunications network comprising a long term evolution (LTE) and/or IP Multimedia Subsystem (IMS) network.

* * * * *

UNITED STATES PATENT AND TRADEMARK OFFICE
CERTIFICATE OF CORRECTION

PATENT NO. : 10,425,342 B2
APPLICATION NO. : 15/382057
DATED : September 24, 2019
INVENTOR(S) : Gupta et al.

It is certified that error appears in the above-identified patent and that said Letters Patent is hereby corrected as shown below:

On the Title Page

Item (57) Abstract, Line 12, please replace --quality of service-- with --QoS--.

Page 2, Column 2, Line 58, please replace --Potocol-- with --Protocol--.

Page 2, Column 2, Line 59, please replace --Institue-- with --Institute--.

Page 3, Column 1, Line 7, please replace --3GPPP-- with --3GPP--.

Page 3, Column 1, Line 25, please replace --verstion-- with --version--.

In the Drawings

Sheet 5 of 5, Figure 5, Box 510, please replace --desintation--with --destination--.

In the Specification

Column 1, Line 54, please replace --quality of service-- with --QoS--.

Column 2, Line 2, please replace --quality of service-- with --QoS--.

In the Claims

Column 13, Claim 1, Line 15, please replace --points:-- with --points;--.

Column 13, Claim 1, Line 20, please replace --Quality of service-- with --QoS--.

Column 14, Claim 7, Line 8, please replace --quality of service-- with --QoS--.

Signed and Sealed this
Seventeenth Day of May, 2022

Katherine Kelly Vidal
*Director of the United States Patent and Trademark Office*

Column 14, Claim 7, Line 10, please replace --Quality of service-- with --QoS--.

Column 14, Claim 13, Line 65, please replace --quality of service-- with --QoS--.

Column 14, Claim 13, Line 67, please replace --Quality of service-- with --QoS--.